Figure 1:
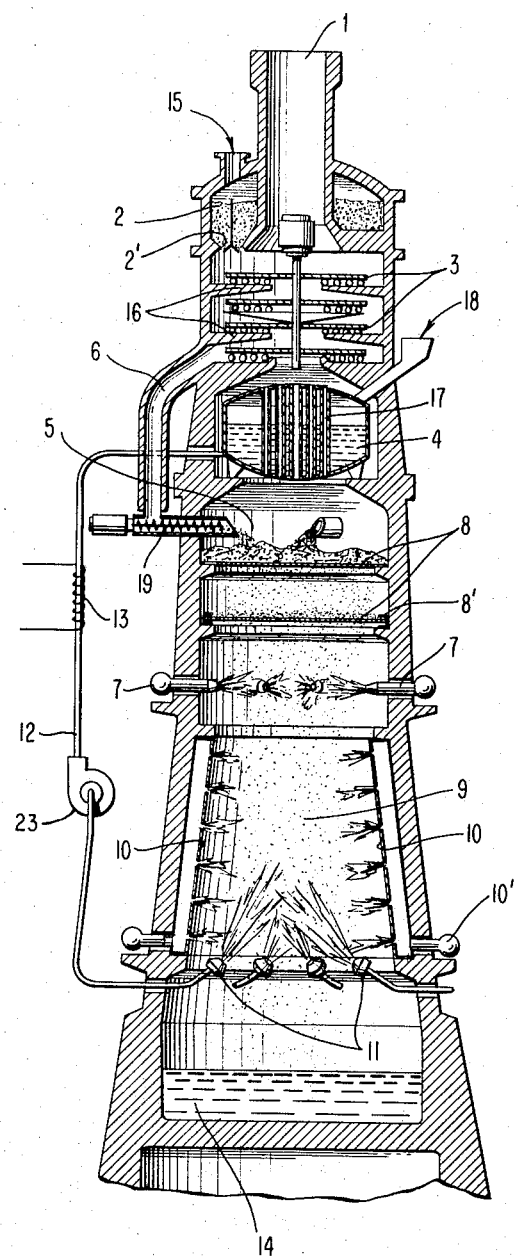

Oct. 31, 1967  P. I. PEYCHES  3,350,213
METHOD OF AND APPARATUS FOR GLASS MAKING
Filed Dec. 3, 1962

INVENTOR.
PIERRE IVAN PEYCHES
BY
*Bauer and Seymour*
ATTORNEYS

3,350,213
METHOD OF AND APPARATUS FOR GLASS MAKING
Pierre Ivan Peyches, Paris, France, assignor to Compagnie de Saint-Gobain, Neuilly-sur-Seine, France
Filed Dec. 3, 1962, Ser. No. 241,885
Claims priority, application France, Dec. 7, 1961, 881,265
9 Claims. (Cl. 106—52)

This invention relates to a method of making glass and to an apparatus adapted to carry out the new process.

In the standard methods of making glass the constituents of the batch are floated on a bath of molten glass, are melted there, are mingled with the molten glass as they melt, and are eventually fined and conditioned for working. The raw materials used in making the glass are, for instance silica, usually in the form of sand, oxides of alkali and alkaline earth metals, usually as carbonates, and other ingredients which need not be mentioned here. That is substantially the only method of melting glass commercially, and it places the batch materials which are to be melted under conditions which contribute but little to the production of a homogeneous flow with a high rate of reaction. In effect, the powdered materials put into the furnace are opaque to the radiation which accomplishes much of the melting and its physical structure inhibits good heat conduction. The penetration of heat into the melting batch is slow and more fusible ingredients, notably the alkali and alkaline earth carbonates, run into the batch without having reached the temperature at which they actively digest the silica. In order to retard that separation it is customary to enclose cullet having a viscosity sufficiently high to retard this liquidation.

The thermal yield is low and it is exceptonal when rates of fusion above 1.5 to 2 metric tons per square meter of active surface are attained within the furnace without overheating the furnace. It is also to be noted that heat is only transmitted, in the standard furnaces, through the surface of the floating batch, emerged as well as submerged, before penetrating throughout its whole volume. Consequently, it has been the custom to use floating lumps as small as possible in order to attain the largest surface area possible relative to the volume of batch which is to be melted.

Many proposals were made for the improvement of the process, including one in which the finely divided raw materials are dropped into a space heated to melting temperature under the theory that they would become molten before reaching the surface of the batch but the proposal was unsatisfactory; the grains of sand are, in all standard glasses, the preponderant and most refractory constituent, so that the other constituents are brought to the melting temperature more rapidly than the sand, enter into various combinations with one another, for instance sodium carbonate and calcium carbonate combining, are molten and start either to decompose or to volatilize before the grains of silica have become reactive.

In order to reduce that difficulty, it has been proposed to melt the carbonates with some of the silica separately and to pour the liquid obtained on blocks or masses or silica, but that did not succeed in increasing the rate of the reaction nor the production of a uniform, homogeneous glass.

Where ever I state in this specification that something has been proposed, I do not mean that it is a part of the prior art and it is accordingly to be understood that such statements are not to be treated as anticipatory but are rather to be regarded as proposals which have been discussed by the inventor of this invention, and which have been regarded as not wholly satisfactory. In the absence of evidence to the contrary, these references are to be treated as the first evidence pertaining to the subject.

The present process is an improvement in the melting of glass. In general, the novel process embodies the principle of treating specially by heat the constituents in the manufacture of glass and in introducing those constituents in dispersed state into the reactor under conditions most favorable for a high reaction efficiency. According to another characteristic of the invention, it provides melting the glass batch in individual grains as distinguished from the bulk methods of the prior art, and the formation of glass by the reaction of the silica with other constituents notably carbonates in a gaseous medium.

The following examples illustrate the process.

*Example 1*

It was determined to make a silica-soda-lime glass containing 73% $SiO_2$, 15% $Na_2O$, and 12% $CaO$. In order to accomplish this it was computed that the batch should contain the following ingredients:

| | Parts by weight |
|---|---|
| Sand | 100 |
| Sodium carbonate | 35.14 |
| Limestone | 29.34 |

From this batch 137 parts of glass were obtained.

The sodium and calcium salts were intimately mixed. The sand was heated separately to a temperature approaching 1250° C. At this temperature the grains of sand remained stable and did not agglomerate one with another. These grains of sand were at a temperature at which they were capable of reacting with sodium and calcium carbonates. The furnace into which they were dropped consisted essentially of a vertical tube which was interiorly heated to a temperature adequate to maintain the temperature of the sand grains as they fell through the tube. The mixed constituents were independently heated to a temperature of less than 850° C., and consequently they were molten and in a condition to react with the silica. The sodium carbonate and the calcium carbonate were in a proportion which corresponded approximately to the double salt $Na_2Ca(CO_3)_2$, which melts at 813° C., enriched with a small amount of the eutectic containing 0.4 CaO which melted at 784° C. The mixture of the two carbonates was thus melted below 850° C. and at that temperature it was sprayed into the reactor into contact with the falling grains of sand. Its density was at that time 2.4 which was substantially the same as that of the sand and that of the vitreous product at 1000° C. The volume of the drops of carbonate which were destined to coat the grains of sand bore the relation to the volume of the sand grains of .64 to 1. Expressed in terms of diameter, the drops of carbonates were about .86 of the diameter of the sand grains.

A sufficient approximation for practical purposes is obtained as the atomization of the carbonates produces drops of about the same size as the particles of sand. The diameters of the silica particles and the drops most favorable may be between about 50 and 300 microns. Finer subdivision would permit an almost instantaneous reaction but a part of the silica would be entrained by the gases and a grosser subdivision of the reactive particles is apt to needlessly extend the time required for the completion of the glass reaction. The drops of molten carbonate strike and adhere to the falling grains of sand, coat them and react vigorously with the release of $CO_2$ by the reaction of the carbonates. Under the circumstances stated hereinabove, the liquid film which coats the grains of sand initially is equal to about $\frac{1}{10}$ of the diameter of the grain. The capillary forces are sufficient to keep the drop as a cover over is solid silica core, and its thickness is so small that the gases released by the reaction are discharged instantly from the surface. A major problem of fining glass by the usual fining methods is the difficulty of the discharge of gases of reaction. A disadvantage of the standard method of fining is that it requires a fining temperature which may go as high as 1600° C. A particular advantage of the present invention is that such fining techniques are eliminated, it being unnecessary to raise the temperature substantially beyond 1300° C.

After the sand grain has been coated by the drop the combined volume is increased ⅔ compared to the original volume of the grain. It is approximately the same for the entire mass whereas the increase of the cross section concerning the limit fall speed, if the grains are considered as spheres, is only ⅟₁₀.

The rate of fall of the particles after coating is faster than before coating, by about 10%, and this fact has enabled me to control the process beyond what would have been expected. However, this figure of 10% is really increased because, before coating, the grains of sand are not spherical and their coefficients of penetration are lower, whereas the drop after coating is spherical and presents the maximum weight for the minimum cross section.

Under these conditions, the reactor may be filled with ascending hot currents of gas and this is driven at a speed on the order of 3 m./sec. The grains of sand introduced into the upper part will have a speed of descent which is either zero (0) or very small and will remain in this area of quasi suspension long enough to insure its contact with a drop. When the contact has taken place, the rate of fall accelerates on the order of 30 to 50 cm./sec., so that the coated particles fall through gases which maintain the temperature of reaction, eventually to be received as glass in a sump at the bottom of the reactor.

As it is not easy to obtain uniform rates of ascent in the hot ascending gases, the hereabove explanation must be understood as essentially statistical in nature and is given to show that the invention makes it possible to obtain a somewhat regulating effect.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 2:
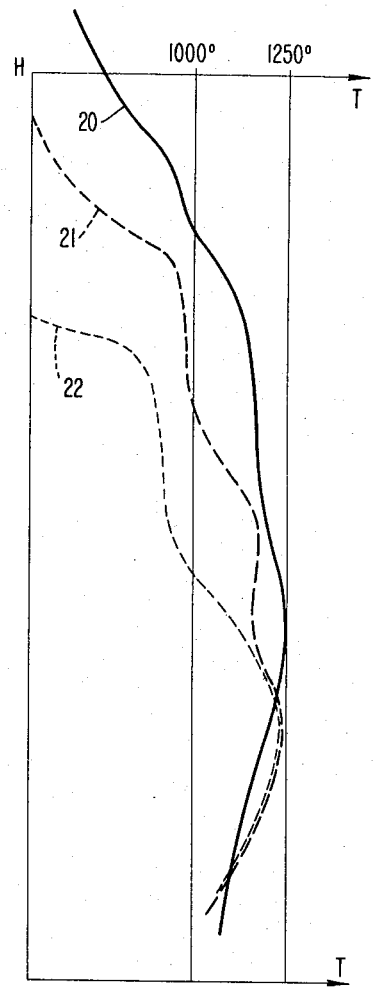

In the drawings, wherein like reference characters refer to like parts throughout the several views, FIG. 1 is a vertical section through the novel furnace;

FIG. 2 is a graph showing the temperatures existing in the various levels of the furnace from the sump to the stack.

To survey the operation of the furnace generally before examining its particular construction a sump 14 holds the molten glass, atomizers 11 inject molten carbonate drops into the falling sand, burners 10 heat the main reaction level of the furnace, burners 7 heat the sand grains falling through distributing sieves 8, conveyors 19 inject sand onto the sieves, fire tube tank 4 having fire tubes 17, melts the carbonates, sand reservoir 2 receives the residual heat of the gases engaging the stack 1.

The furnace includes at its upper level a stack 1 and a silo or reservoir 2 into which sand is admitted through port 15. The sand is warmed by the stack gases and falls onto plates 16 through funnels 2′ of variable apertures. The sand is blended on the plates 16 by rakes 3 and falls from level to level until it passes through the aperture in lower plate 16 and is distributed to conduits 6 at a temperature which has been increased by the flow of hot gases into and out of the chamber between the annular plates 16.

At this point it has a temperature of about 900° C. derived from the gases which go through tubes 17 in melting tank 4. Screw conveyors 19 take the sand and inject it into the level of the furnace above the top screen or sieve 8.

Supported in the area between the screen 8 and the plates 16 is the melting tank 4 into which the carbonates are poured through funnel 18, being melted thereby gases which reach that level at a temperature around 1200° C. and which come from room 5 where the sand introduced through conduits 6 and screw conveyors 19 is overheated. The molten carbonates then flow through a conduit 12 which is heated by an electrical resistor or resistors 13 to a temperature sufficient to keep the flow molten. One or more pumps schematically indicated at 23, force the liquid through atomizer heads 11 which subdivide it into tiny droplets into approximately the same size as the sand or somewhat finer. The sand passes downward through the screens 8 which may be vibrated for purposes of effect, or which may have rotary distributing bars, which disperse the grains evenly throughout the width of that area of the furnace. Hot gases acting in this region raise the temperature of the sand to about 1200° C. The burners 7 furnish the heat necessary to raise the grains of sand to the desired temperature.

In the reactor, properly so called, 9 there is a body portion which is slightly conical so that the aerodynamical flow of gases which maintain the temperature will increase in speed toward the upper part of the section. The reactor is heated by means of a combustion grill 10 which has a low output per unit of surface, the grill extending substantially throughout the wall of the reaction section. This arrangement maintains a somewhat higher pressure at the surface of the grill, near the walls, and confines the zone of reaction at the axis of the reaction section. The inclination of the grill and this increase in pressure prevent the glassing up of the burner grill.

The grill is supplied with gas, for instance natural or gas from city mains, by tuyeres 10′, which fills the space between the grill and the wall without burning and ignites after it passes through the grill.

The drops of glass which are formed in the upper part of the reactor complete their reactions in the median parts of the furnace and fall as a rain into the receptacle 14. There is no fining zone, the glass being produced in a fined condition ready for working without having heated the glass-making materials substantially over 1300° C. This produces notable economy with respect to classical processes where the temperatures in the fining zones equal or even rise above 1600° C. The temperature curve existing in the furnace during operation is indicated in FIG. 2, for the different levels of the furnace. The solid line 20 represents the temperatures of the gases at various levels; the dash line 21 represents the temperature of the sand; the dotted line 22 represents the temperature of the carbonates, it being observed that they take the same temperature when the reaction has taken place.

In order to facilitate the meeting of the molten drops and the grains of sand, the invention provides that the liquid and sand may have electrostatic charges to a convenient potential, for example the sand being charged negatively with respect to ground. The sand particles can be charged by letting these particles fall through an electrical ionizing field generated by a plurality of vertical tubes connected to ground and conducting wires crossing each tube along its axis and brought to a negative potential of a few kilovolts. Conventional particle-charge apparatus is shown in class 239 of which Chaffee, U.S. Patent No. 1,928,963, is illustrative.

The method may be carried out by heating silicious grains to a temperature in the glass-forming range, electrically charging said grains in a state of suspension and introducing the charged grains into a gaseous vitrification zone, charging finely divided molten particles of the glass-forming ingredients with an opposed electrostatic potential and introducing them into the vitrification zone.

The liquid carbonates will be usually left at ground potential as they issue from the atomizer. Nevertheless, if the atomizers are such that they permit the charging of the drops, it is preferable to do so because it eliminates the coalescence of the droplets, because of their electrostatic repulsion, so long as that charge has not been neutralized by encountering a sand grain of opposite charge.

The mixture of molten carbonates forming a conducting liquid must be sprayed through an ionizing field generated by a wire brought to a positive potential and a grounded electrode.

It follows from this that all or part of the heating of the furnace may be assured by means other than gas heat, notably by electric means, always provided that the substitution for one heating means should maintain the conditions of operation which have been set forth hereinabove.

*Example 2*

According to the method of the present invention a batch composed of:

100 parts by weight of sand
84.89 parts by weight of the following ingredients:

|  | Parts |
|---|---|
| Dolomite | 36.10 |
| Limestone | 3.28 |
| Cryolite | 9.51 |
| Dehydrated borax | 13.34 |
| Soda carbonate | 22.6 | heated respectively to the same temperatures for sand and constituents as in Example 1 have given 154 parts of a glass containing:

|  | Percent |
|---|---|
| $SiO_2$ | 65.00 |
| $Al_2O_3$ | 1.50 |
| CaO | 8.50 |
| MgO | 5.00 |
| $Na_2O$ | 14.00 |
| $B_2O_3$ | 6.00 |
| +F | 3.35 |

This invention involves a method of making glass which comprises coating overheated sand grains with at least one member of the class of alkali and alkaline earth carbonates in a hot gaseous medium. It also includes a glass making apparatus including a vertical melting chamber, means to drop sand through the chamber, heating means to heat the falling sand to glass-forming temperature, and means to coat the falling hot sand particles with molten, glass-forming raw materials. A characteristic of the invention is that each grain of sand is raised to an elevated temperature which is below that at which the sand particles would frit together or form crystal types of less reactive nature, such for example as high cristobalite. In the case where the sand is heated, in a mass or in fluidized bed, it suffices to prevent accidental agglomeration to avoid evceeding the temperature of 1450° C. If this danger does not exist, for example when the heating of each grain is individually accomplished by introduction into a hot gas, the temperature will nevertheless be limited to less than 1600° C., for example 1550° C., because after reaction of these grains on the other constituents with the production of a drop of glass, the latter would be found overheated and in a condition capable of losing part of its constituents.

Another characteristic of the invention consists in individually coating each overheated grain of sand by cooler other molten constituents in particular by sodium and calcium salts. Alkali oxides and alkaline earth oxides will readily enter into the silica structure and confer upon it the vitreous state, if they are introduced as carbonates which decompose in contact with the silica. A premature decomposition of carbonates outside the silica makes the glass-forming reaction with the silica more difficult and the temperature levels disclosed herein should be respected. It is also bad to heat from the exterior a granule constituted of a silica grain enclosed by other constituents which are then constantly hotter than the silica. In the process according to the invention the silica core is hotter than the exterior ingredients and heats them by contact.

The exterior ingredients are advantageously pre-heated before introduction to the reaction, and in the preferred form of the invention, they are molten before contacting the grains of sand.

The grain by grain reaction which constitutes another characteristic of the invention makes is advisable to introduce ingredients other than silica (and certain minor constituents which may be introduced at the same time as the silica) as a mist of liquid drops in the relation desired.

I have established that under these conditions the surface of the drop of carbonate which has coated a grain of sand and which is relatively fluid, even though it is relatively cold, easily releases the gases, notably $CO_2$, which are derived from reactions proceeding at inner layers, and that this release is so effective that there is substantially no increase of pressure in the reaction zone, which would interfere with the reaction. It is sufficient if the fineness of the sand and the drops is such that they produce a slow descent through the reaction zone, the speed of fall increasing when the grain is finally coated by the drop.

An advantage of the invention is the manufacture of glass in drops. Another advantage is the manufacture of glass at lower temperatures than are provided by standard processes, including the elimination of furnaces of ordinary construction, and the handling of vast masses of materials which are not fully homogeneous.

Another advantage is the economic use of heat and the thermodynamic perfection of the furnace and the process.

It will be appreciated that this invention involves a method of reacting siliceous grains with reactive, metal, oxygenated compounds which comprises maintaining the siliceous grains in a state of quasi suspension and slow fall in a current of hot gas at reactive temperature, coating the grains with reactive, molten, oxygenated metal compounds, and thereby increasing the density of the coated grains sufficiently to cause them to fall more rapidly through the current of hot gas and to be withdrawn from the uncoated grains.

As many apparently widely different embodiments of the present invention may be made without departing from the spirit and scope thereof, it is to be understood that the invention is not limited to the specific embodiments.

What is claimed is:

1. A method of making glass which comprises coating heated sand grains suspended in a hot gaseous medium with at least one heated and molten member of the class of alkali and alkaline earth carbonates, the sand grains being heated to a temperature at which the glass forming reaction will occur, each sand grain reacting with its coating of molten alkali and alkaline earth carbonates to form a droplet of glass, and collecting the droplets as a mass of molten glass.

2. A method of making glass which comprises preheating sand grains to glass-forming temperature, dropping the sand grains into a hot gaseous medium, and spraying cooler droplets of molten carbonates of alkali and alkaline earth metals upon the sand grains in the gaseous medium to coat the grains and thereby effect a glass-forming reaction between the grains and their coating, to form droplets of molten glass.

3. A method of making glass which comprises heating sand grains to a temperature above the melting point of the constituents of the batch containing alkali and alkaline earth metals, but not substantially over about 1550° C., melting a carbonate from the class of alkali and alkaline earth metals at not substantially more than 850° C. forming drops of the molten carbonate, and bringing the hot sand grains and molten drops of the carbonate into contact while falling through a hot gaseous medium thereby coating the sand grains and forming glass.

4. A method of making glass which comprises dropping sand grains averaging between about 50 and 300 microns in size at a temperature not substantially less than 900° C.

into a rising current of hot gases flowing at about 3 m./sec. having a higher temperature which approaches a maximum of about 1300° C., spraying melted batch ingredients of lower temperature of reaction at lower temperature into the falling sand grains in droplets averaging about .86 to 1.0 times the diameter of the sand grains, to cause each grain of sand to react with the melted batch ingredients and form a droplet of glass.

5. A method of reacting siliceous grains of glass-making grade which have been heated to glass-making temperature with reactive glass-making ingredients of lower melting point which comprises maintaining the siliceous grains in a state of quasi-suspension and slow fall in a rising current of hot gas at reactive temperature, and coating the suspended grains with reactive, molten glass-making ingredients of lower melting point, thereby forming vitreous grains of density sufficient to cause them to fall more rapidly through the current of hot gas.

6. That method of making glass, comprising, heating mixed batch ingredients having a melting temperature lower than silicon, to the melting point of said batch ingredients, spraying said melted batch ingredients into a rising current of heated gaseous medium, simultaneously heating sand grains to the glass-forming reaction temperature thereof, distributing the heated grains into said current of gaseous medium to cause the same to descend in and through said medium and coat each said grain with a coating of said melted batch ingredients, each said grain reacting with its coating to form a droplet of glass descending through said rising current 7. That method of making glass, comprising, creating a confined rising current of hot gaseous medium in and through a reaction zone, heating the batch ingredients other than silica, to the melting point thereof, spraying the melted batch ingredients into said zone to disperse the same throughout said gaseous medium, simultaneously preheating sand grains to the temperature at which they will react with said batch ingredients to form glass, distributing the grains uniformly into said gaseous medium above said zone, to cause the grains to descend slowly through said zone until each has a coating of melted batch ingredients, reacts therewith to form a droplet of molten glass, and moves downwardly out of said zone.

8. The method of claim 7, and adjusting the rising current of heated gaseous medium so that each uncoated grain descends slowly through said zone and accelerates downwardly out of said zone when it becomes a droplet of glass.

9. A method of making glass which comprises heating siliceous grains to a temperature in the glass-forming range, electrically charging said grains and dropping the charged grains into a gaseous vitrification zone, charging finely divided molten particles of glass-forming ingredients other than said siliceous grains with an opposed electrostatic potential and introducing them into the gaseous vitrification zone and into contact with said falling grains, thereby forming drops of molten glass.

References Cited

UNITED STATES PATENTS

| | | | |
|---|---|---|---|
| 1,928,963 | 10/1933 | Chaffee | 239—2 |
| 2,044,680 | 6/1936 | Gilbert | 65—142 |
| 2,219,331 | 10/1940 | Pirani et al. | 106—52 |
| 2,398,952 | 4/1946 | Nachod | 65—335 |
| 2,434,303 | 1/1948 | Weyl | 106—52 |
| 2,455,907 | 12/1948 | Slayter | 65—21 |
| 2,658,743 | 11/1953 | Speil et al. | |
| 3,063,788 | 11/1962 | Veazie | 65—2 |
| 3,085,749 | 4/1963 | Schweitzer et al. | 239—15 |
| 3,113,856 | 12/1963 | Plumat et al. | 65—335 |
| 3,251,551 | 5/1966 | Walberg | 239—15 |

FOREIGN PATENTS

| | | |
|---|---|---|
| 594,468 | 3/1960 | Canada. |
| 682,356 | 11/1952 | Great Britain. |
| 763,272 | 12/1956 | Great Britain. |

HELEN M. McCARTHY, *Primary Examiner.*

TOBIAS LEVOW, *Examiner.*